United States Patent [19]  [11] Patent Number: 4,837,881
Kondo et al.  [45] Date of Patent: Jun. 13, 1989

[54] SEAT CUSHION WITH PORTIONS WITH DIFFERENT COMPRESSION CHARACTERISTICS

[75] Inventors: Nobuaki Kondo, Yokohama; Shinichi Yamazaki, Kanagawa, both of Japan

[73] Assignees: Nissan Motor Co., Ltd., Yokohama; Toyo Tire & Rubber Co., Ltd., Osaka, both of Japan

[21] Appl. No.: 127,236

[22] Filed: Dec. 1, 1987

[30] Foreign Application Priority Data

Dec. 2, 1986 [JP] Japan ................................ 61-185707

[51] Int. Cl.⁴ ............................................... A47C 7/18
[52] U.S. Cl. ......................................... 5/464; 5/481; 297/459; 297/DIG. 1
[58] Field of Search ........................... 5/436, 464, 481; 297/459, DIG. 1

[56]  References Cited
U.S. PATENT DOCUMENTS

| 4,405,681 | 9/1983 | McEvoy | 5/481 X |
| 4,682,818 | 7/1987 | Morell | 5/464 X |
| 4,726,086 | 2/1988 | McEvoy | 5/481 X |
| 4,726,624 | 2/1988 | Jay | 297/459 |
| 4,755,411 | 7/1988 | Wing et al. | 5/481 X |

FOREIGN PATENT DOCUMENTS 57-351 5/1981 Japan .
58-58750 4/1983 Japan .

Primary Examiner—Gary L. Smith
Assistant Examiner—Michael F. Trettel
Attorney, Agent, or Firm—Koda and Androlia

[57] ABSTRACT

A seat cushion with compression characteristics which differ by portions including an upper layer portion, which is made of a low hardness foamed body and forming an entire surface of the seat, and a lower layer portion, which is made of a high hardness foamed body and supporting the upper layer portion, the upper and lower layer portions being soft composition polyurethane foamed bodies and molded in a same foaming mold to form an integral body with a strong boundary portion formed along their interface. A basic profile of the upper layer portion is a sloped plane with its height increased toward a front, edge, in the longitudinal direction, while that of the lower layer portion corresponds to a sitting posture of a human body occupying the seat. In a hind seat portion, a thickened portion is provided for the entire surface in a transverse direction by thickening the low hardness foamed body into having a cross section of a concaved arc form in the longitudinal direction by approximating the sitting posture line of a buttocks. In a front seat portion, on either a right or left side, the upper layer portion is made thicker than the basic profile by gradually increasing its thickness toward the front edge in sloped form, in the longitudinal direction, with this thickened portion shaped into a circular arc form in the transverse direction.

3 Claims, 3 Drawing Sheets

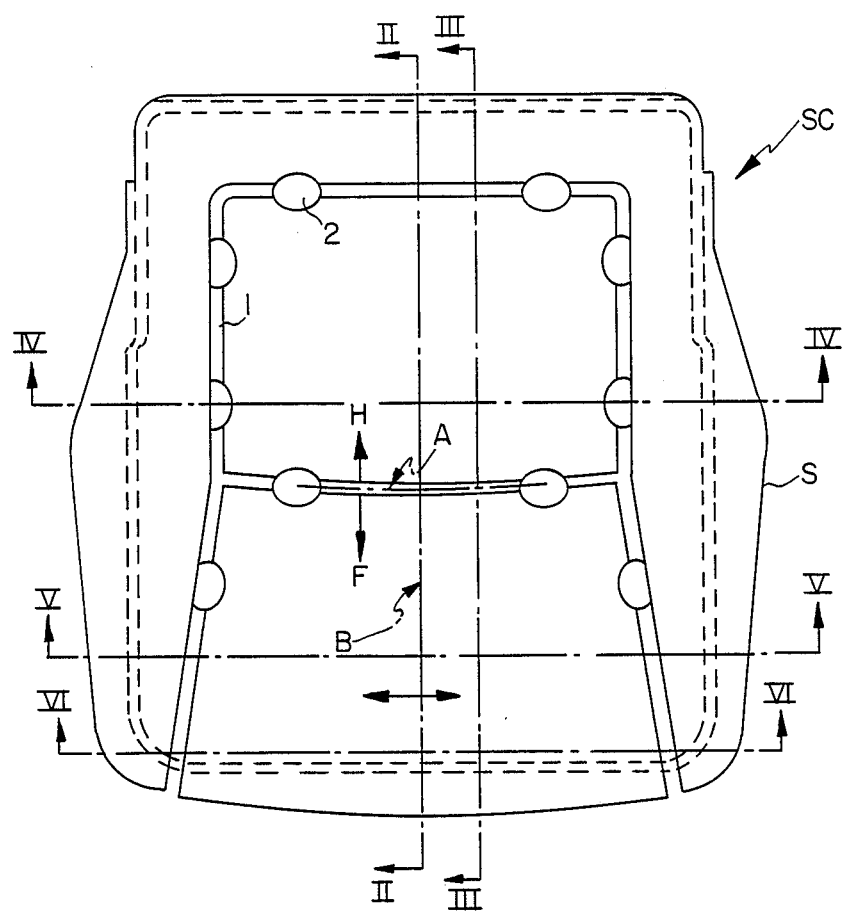
FIG. I

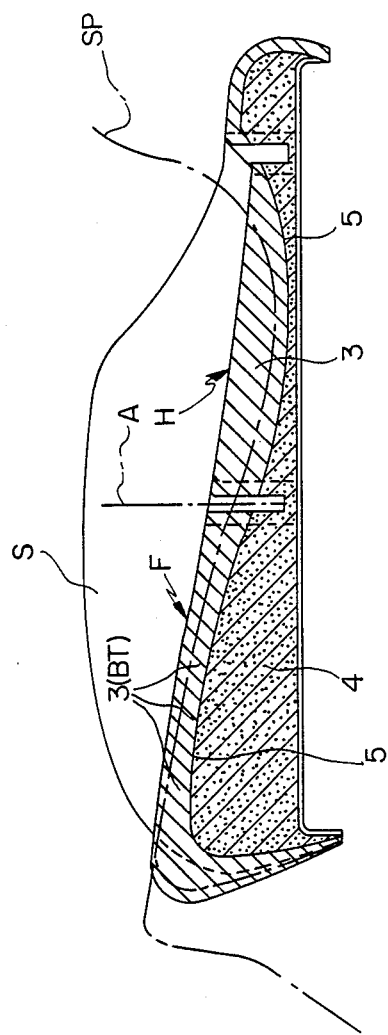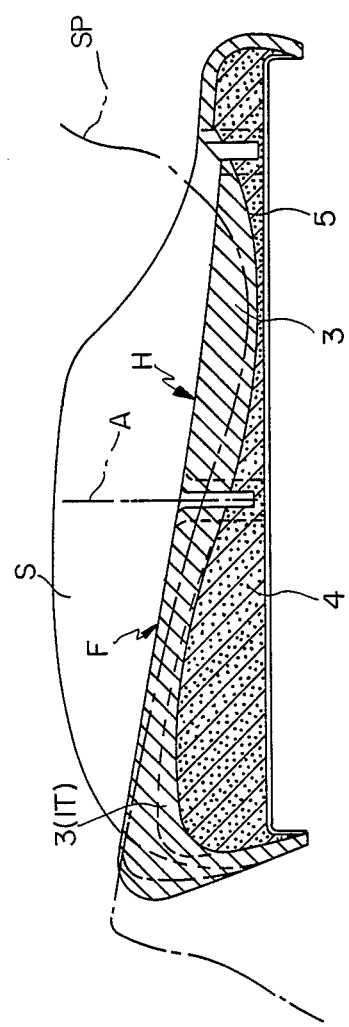

SEAT CUSHION WITH PORTIONS WITH DIFFERENT COMPRESSION CHARACTERISTICS

BACKGROUND OF THE INVENTION

1. Field of the Invention

The present invention relates to a seat cushion for an automobile that provides a secure seat with a cozy feeling, increases driving comfort, and is particularly suitable for use as the front seat for the driver.

2. Prior Art

As a structure of such seat cushions used conventionally for vehicles, for example, there is one provided by the Japanese Utility Model Laid-Open Application No. 1982-351 (Title: Cushion Structure For A Seat). According to the foregoing Utility Model Application, it is "a structure of a seat cushion constructed by mounting a padding material formed into a specified shape, on a bottom plate, and by covering the said padding material with a facing sheet; in which the padding material is divided into two layers, that is, an upper layer and a lower layer, with the lower layer pad made harder than the upper layer pad, and a boundary plane between the upper layer pad and the lower layer pad formed into a shape fitting a body shape of a person who occupies the seat; also, a hardened layer is formed in the upper layer pad along its surface bordering on the lower layer pad."

The practical structure of the above is as mentioned below. That is, the upper layer pad obtained by placing a rigid fiber material, such as hair felt, on a bottom surface of a molding block for the upper layer pad, injecting foaming solution of polyurethane to thereby form the strong hardened layer with the foregoing rigid fiber material impregnated with polyurethane, along the underside of the upper layer pad, is superposed on the lower layer pad harder than the upper layer pad. The lower layer pad is obtained by foam-molding by using a separate mold. Then, the upper layer pad and the lower layer pad are wrapped with a facing sheet. Thereafter, they are fastened to the bottom plate, by appropriate means, such as hug rings. Also, for laying the upper layer pad on the lower layer pad, their boundary surfaces are formed into angled shapes at their front portions and rear portions in order to prevent the slipping off of the upper and lower layer pads from each other. In other words, the pads are not formed integrally, and the upper layer pad and the hard lower layer pad are formed by using respectively different molds, and then, they are overlapped on each other and fastened after covered with a trim cover.

Also, as a structure for the cushions for the front seat systems for drivers, for example, another is provided by the Japanese Utility Model Laid-Open Application No. 1983-58750 (Title: Driver Seat Structure Of Automobile). The description of this Utility Model Application is given as follows: That is, it is "a structure of a driver seat in an automobile, that is characterized in that, in a structure of the driver seat of automobile with a special form (differently formed) portion for relaxing provided at front area of the cushion seat, at least at the front area of the cushion seat, a right side portion and a left side portion of a seating portion are formed of elastic bodies which are different from each other in modulus of elasticity."

It means that, on the right side and the left side of the front area of the special form portion in the center area of the cushion seat, for giving relaxation, pads with qualities which are different from each other in terms of modulus of elasticity are buried along a front edge of the seating portion. Furthermore, the heights of the right and left side pads at the front edge portion of the cushion seat are made different from each other for the purpose of facilitating the conformity of the cushion of the front seat to the positional change of the thigh of the driver's leg, that is used for treading on the pedal.

"The Cushion Structure Of The Seat" provided by the prior art as mentioned above is a double layer structure in which the lower layer pad and the upper layer pad are formed by molding them separately, and the upper layer pad, with the hardened layer obtained by using a rigid fiber material formed along its boundary surface, is laid on a top of the separate lower layer pad; then, both of the foregoing pads are covered with a facing (trim) sheet and fastened. Therefore, it is defective in that it is inferior in stability of the cushion seat. In addition, because the front portion of the hardened layer is curved downward so that the height becomes reduced in the forward direction, it lacks stability suitable for sitting posture, and also it is inferior in providing good operability for the leg.

As to the "Driver Seat Structure Of Automobile," since the two types of pads made of the materials which are mutually different in modulus of elasticity are buried in the right and left side portions in the center area of the front portion of the cushion body, with which the thighs of the driver are in contact, an abrupt difference is caused in elasticity between the right and left sides in the boundary region in the center of the front area of the cushion body. Accordingly, not only is it difficult to obtain a comfortable sitting feeling because of the feeling of unfitness caused by the abrupt difference in elasticity, but also there is a defect that the front area of the cushion body always functions unevenly with respect to the height.

SUMMARY OF THE INVENTION

Consequently, the inventors of this invention intend to solve the above-mentioned problems, and the object of the invention is to provide a seat cushion having stable seating capability.

Another object of the invention is to provide a seat cushion that provides cozy sitting without causing a feeling of unfitness for the proper sitting posture of a driver.

A further object of the invention is to provide a seat cushion that facilitate an operation of the driver.

The above-mentioned objects of the invention are achieved as follows. That is, the seat cushion according to the invention is constructed of an upper layer portion and a lower layer portion which are foamed bodies with a soft composition and which are different from each other in deformation against a given load. The upper layer portion is made to be a low hardness foamed body while the lower layer portion is made to be a high hardness foamed body. The upper layer portion and the lower layer portion are bonded firmly in a same foaming metal mold to form an integrally structured seat cushion. A seating surface of the seat cushion obtained as mentioned above is all formed of the low hardness foamed body. A basic profile (nominal contour) of this low hardness foamed body is shaped to have a plane inclined in a longitudinal direction, with its front face portion made higher. This way, it is possible to obtain a satisfactory sitting posture.

Furthermore, the shapes of the interface between the lower layer portion made of the high hardness foamed body that supports the upper layer portion and the upper layer portion made of a low hardness foamed body, that is, the basic profile (see FIG. 2) of the lower layer portion made of the foamed body with high hardness, are formed to have a shape with which a satisfactory sitting position of a person sitting on the seat is obtainable. Also, a strong boundary portion is formed along the interface between the upper layer portion and the lower layer portion which are combined into integral unit.

The basic profile of the foregoing lower layer portion is formed as follows: The hind seat portion is made to have a concaved circular arc form so that a buttocks of a driver can be supported stably. For a front seat portion, either on a right side or a left side, the thickness of the low hardness foamed body that forms the upper layer portion is made thicker than that of the basic profile of the other side so that the compression characteristics on the left side and the right side of a center line in a transverse direction become different from each other by gradually increasing the thickness on the side to be made thicker than that of the other side toward the front, in a sloped form, in a longitudinal direction, with a circular arc shape thickened portion formed also in the transverse direction.

In other words, in order to provide the portion of the low hardness foamed body on the pedal treading operation side, with which the thigh of the leg that is to increase the pressure applied to the seat during the operation is in contact, with maximum thickness, a portion thickened into a circular arc shape is formed by gradually increasing the thickness in the circular arc formed in the transverse direction, then by gradually decreasing the thickness in a circular arc form, toward an outside, starting from the thickest point. The thickened portion in the transverse direction mentioned above is formed by gradually increasing the thickness, from the demarcation line for the longitudinal direction, toward the front edge, so that it can readily cope with the increase in pressure during operation.

The integral structure mentioned above is obtained by foaming and combining the upper layer portion and the lower layer portion in a same metal mold. As the foamed body to be used, a polyurethane elastic body is preferable. The details of the structure will be given with reference to the drawings of the embodiments.

In this invention, since the lower layer portion made of a foamed body with high hardness is shaped to conform to the sitting posture of the driver, a stable sitting body form can be obtained. Also, because it is constructed as an integral body, a strong bonding force for combining the upper layer portion made of a low hardness foamed body with a lower layer portion made of a high hardness body can be obtained. In particular, since the upper layer portion of the seat cushion is all formed of a low hardness foamed body with the same composition, absolutely no feeling of unfitness is caused, and a comfortable feeling for sitting is obtainable.

In addition, a thickened portion is provided by gradually increasing the thickness of the upper layer portion on the side to support the leg that operates the pedal, etc. during the driving, in a circular arc form, so that the portion with which the thigh of the leg that is to increase the pressure applied to the seat is in contact with is given the maximum thickness, and then by gradually decreasing the thickness around the outside, toward outside, in a circular arc form. Therefore, plastic deformation is restrained on both sides of the circular arc. As a result, a cushioning function with desirable stability (restoring capability) can be obtained.

Furthermore, because the area of the upper layer portions mentioned above is supported by the area of the lower layer portion made of the high hardening foamed body, that is formed in concaved circular arc, the flexible deformability that quite readily fits to the movement of the leg in operation, as well as the excellent restoring capability, can be obtained. Besides, since the upper layer portion made of a low hardness foamed body is strongly bonded to the lower layer portion made of a high hardness foamed body to form the integral unit, creep deformation that is caused by elastic deformation with the passage of time is restrained. Consequently, a flexible elastic deformation having the satisfactory restoring capability can be maintained for a long period of time.

BRIEF DESCRIPTION OF THE DRAWINGS

The above mentioned features and objects of the present invention will become more apparent in the following description taken in conjunction with the following drawings in which like numerals denote like elements and in which:

FIG. 1 is a plan view of a seat cushion as an embodiment of this invention;

FIG. 2 is a sectional view taken along the line II—II (center line B) in FIG. 1;

FIG. 3 is a sectional view taken along the line III—III in FIG. 1;

DETAILED DESCRIPTION OF THE INVENTION

Figure 4:
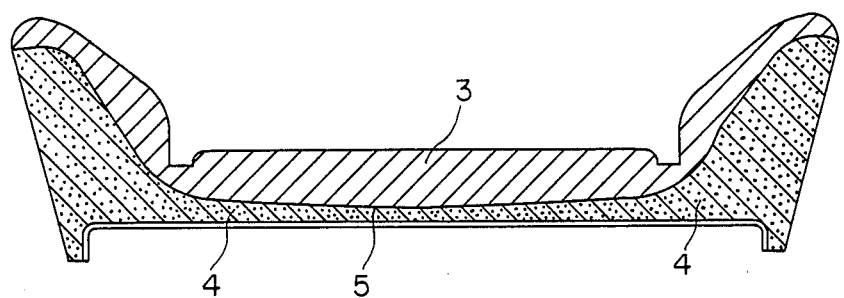
FIG. 4 is a sectional view taken along the line IV—IV of the hind seat portion in FIG. 1.

Hereunder, a detailed description will be provided of a seat cushion with compression characteristics which differ by portions of the present invention with reference to the drawings.

In FIG. 1, SC denotes a seat cushion according to this invention (in this embodiment, a foamed body of polyurethane is used), A represents a demarcation line in a longitudinal direction as to the seat portion. That on a rear side of this demarcation line A is the a hind seat portion H, and that located on a front side of the demarcation line A is a front portion seat surface F. B indicates a center line of the seat portion in a transverse direction. S denotes raised side portions on the both sides of the seat portion. Reference numeral 1 represents a fitting groove for a trim cover, and 2 indicates fastening through holes provided at several places of the groove.

FIG. 2 is a sectional view taken the line II—II that is the center line B of the transverse direction of this seat cushion, and it shows a sectional view of a basic profile or nominal contour of the seat cushion provided by the present invention. An entire surface layer is formed of an upper layer portion 3 made of a foamed body with low hardness, and it is formed integrally with a lower layer portion 4 made of a foamed body with high hardness, with an underside of the upper layer portion supported by the lower layer portion.

In other words, the upper layer portion 3 and the lower layer portion 4 are formed into an integral body in a same metal mold by injecting and foaming a compounding stock solution of the lower layer portion 4 on the mold compact of the foamed body of the upper layer portion 3 right after the foam-molding of the upper layer portion 3, that is, around a time close to a tack free time of the foamed body. Therefore, in an interface between them, that is high in density, a strong boundary portion 5 reinforced in physical property and having a strong bonding force by the mingling of molecules of both layer portions is formed. In this manner, the respective characteristics of the low hardness foamed body and the high hardness foamed body are blended completely with each other, and the desirable cushioning and restoring functions are obtained.

Also, by the foregoing strong boundary portion 5, the impact force applied to the upper layer portion 3 made of low hardness foamed body is dispersed over a wide range and supported. As a result, not localized, but overall and satisfactory supporting capability is obtained. The basic profiles in this invention means those constructed to have the cross sectional shapes (as seen in the sectional view along the center line B) in FIG. 2, in which, the seat portion of the upper layer 3 made of low hardness foamed body (the front seat portion F and the hind seat portion H) is formed into a plane that is increased in height toward a front area by forming a slope in the longitudinal direction, while the lower layer portion 4 made of high hardness foamed body (the strong boundary portion 5) is formed by approximating its shape to be the sitting posture (seat position) line SP of a human body occupying the seat portion that is shown by a two-dot chain line.

In the Figure, reference numeral 3 (BT) represents a basic or reference thickness of the front area of the upper layer portion 3 made of the low hardness foamed body as a structural sample in this Figure, and BT is a symbol indicating an area provided with the basic thickness.

Accordingly, the strong boundary portion 5 in the hind seat portion H that is an area contacting with a buttocks of a seated person is formed to have a concaved arc shape in the longitudinal direction for supporting a form of the buttocks, and the upper layer portion 3 made of a low hardness foamed body in that area is thickened into a circular arc shape, with arrangements made for that the low hardness foamed body in the portion to which the load is applied is thickened so that the feeling of wrapping the buttocks softly is obtained to prevent the buttocks from becoming sore, and also that the distribution of the body pressure applied to the seat portion can be responded to with conformity. However, in the transverse direction, as shown in the sectional view in FIG. 4, same cross sectional lines without difference in respective levels are formed. Consequently, as to the form of the lower layer portion 4 made of high hardness foamed body, the area around the center of the hind seat portion H is made thin in thickness along the longitudinal direction, with the thickness increased gradually toward the both ends. That is, an entire seating surface of the seat cushion SC, that includes seating surfaces of the hind and the front portions of seat, is all made of the flat low hardness foamed body with the same composition, with a sloped surface made by increasing the height toward the front edge in the longitudinal direction. The strong boundary portion 5 in the front seat portion F is formed to have a slope that is increased in height toward the front area by nearly approximating its form to the sitting posture line SP. Also, in order to prevent a decrease in cushion angle and to prevent the buttocks from slipping, the thickness of the upper layer portion made of low hardness foamed body is made relatively thin, with the arrangement to provide the support by the lower layer portion 4 made of high hardness foamed body, so that the sitting posture can be maintained to be proper.

Furthermore, in the present invention, the following structure is added to the above-mentioned basic profiles (cross sectional contours FIG. 2). That is, a structure for making a driving operation of a driver easier is provided by forming a thickened portion for facilitating the operation, that readily conforms to the movement of the leg and that is easily restored, through gradually increasing the thickness of the upper layer portion made of low hardness foamed body located on either a right side or a left side of the center line B in the transverse direction in the front seat portion F.

Figure 5:
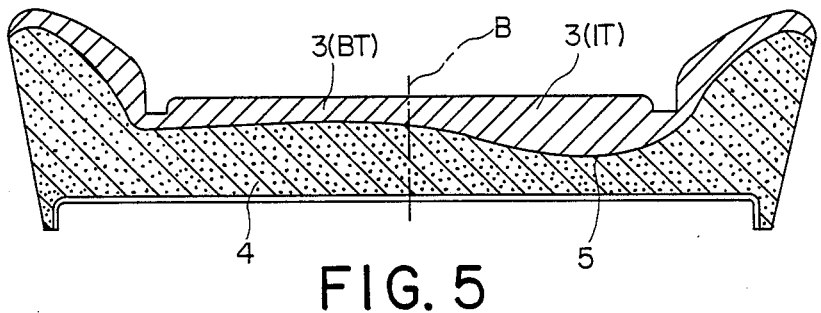
FIG. 5 is a sectional view taken along the line V—V of the front seat portion in FIG. 1.
Figure 6:
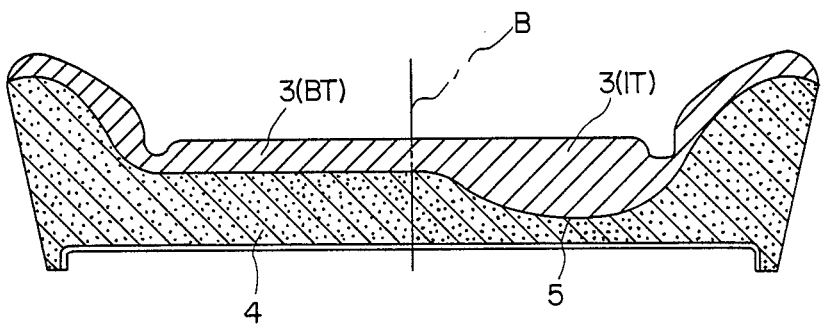
FIG. 6 is a sectional view taken along the line VI—VI thereof.

In the structure mentioned above, as shown in the sectional view in FIG. 3, the thickened portion 3 (IT) (the portion with increased thickness) of the low hardness body (the upper layer portion 3) is formed by gradually increasing its thickness toward the front edge, starting from an area around the demarcation line A, against the basic profile line of the lower layer portion. In the transverse direction, as shown in sectional views in FIG. 5 and FIG. 6, the thickened portion 3 (IT) of the low hardness foamed body (the upper layer portion 3) is formed into a circular arc shape by gradually increasing the thickness on the side for supporting the leg to perform the pedal treading operation to form the circular arc shape so that the portion to which the thigh that applies pressure to the seat during operation is in contact becomes maximum in thickness, then by gradually decreasing the thickness to form the circular arc shape toward the outside in the areas near the outside, and also by increasing the thickness toward the front edge as shown in FIG. 3. In other words, as shown in the sectional view taken along the line V—V of the front seat portion in FIG. 5 and in the sectional view taken along the line VI—VI thereof in FIG. 6, the thickness (of IT) is increased toward the front edge. The IT mentioned above is the symbol indicating the portion with increased thickness.

The seat cushion provided by the present invention is constructed of the two types of members, that is, the upper layer portion (member) made of a foamed body that is low in hardness and the lower layer portion (member) made of a foamed body that is high in hardness, which are soft composition foamed bodies and are different from each other in deformation against a given compressive load. Besides, in the interface between the both of the foamed bodies, the strong boundary portion having the strong bonding force is formed. Thus, a desirable cushioning effect is obtained because of such structure with the low hardness foamed body supported by the high hardness foamed body which is bonded firmly to the former. Also, the seat cushion is formed to have a sitting posture line form, thereby providing to a satisfactory driving position. In addition, in the hind seat portion, a thickened portion with concaved arc shape is formed. Accordingly, a comfortable feeling of sitting as well as an excellently stable cushioning effect can be obtained.

Furthermore, the front seat portion is structured to have an arc form and operation-facilitating thickened portion made of an elastic foamed body in which the low hardness portion and the high-hardness portion are made continuous. Therefore, absolutely no feeling of unfitness is caused, and a satisfactory operational effect for driving can be obtained.

Moreover, the upper layer portion made of a low hardness foamed body and the lower layer portion made of a high hardness foamed body are combined securely to form an integral body by the strong bonding force. Consequently, the cushioning capability with outstanding stability (restoring ability) can be maintained for a long time. Thus, remarkable stability and durability can be obtained.

We claim:

1. A seat cushion with compression characteristics which differ by portions, that is comprised of an upper layer portion made of a low hardness foamed body and a lower layer portion made of a high hardness foamed body which supports said upper layer portion, and in which:

the upper layer portion forming an entire surface of a seat portion has a basic profile formed to have a sloped plane with its height increased toward a front edge in a longitudinal direction;

the lower layer portion has a basic profile that conforms to a sitting posture of a human body;

the upper layer portion and the lower layer portion are combined to form a single unit, with a strong boundary portion formed along their interface;

in a hind seat portion, a thickened portion of the low hardness foamed body having a concave cross section in a longitudinal direction, that is an approximation of a shape of a buttocks in a sitting position, is formed along an entire surface in a transverse direction; and in a front seat portion, on either a right or a left side of a center line in the transverse direction, a thickened portion is formed by making a thickness of the upper layer thicker than that of the basic profile of the upper layer portion, by gradually increasing the thickness toward a front area in the longitudinal direction, and by also shaping the thickened portion into circular arc form in the transverse direction.

2. A seat cushion with compression characteristics which differ by portions as set forth in claim 1, wherein an integral structure is obtained by a strong bonding effected through the injection of foaming solution for a foamed body composing the lower layer portion into a foaming mold for a foamed body composing the upper layer portion.

3. A seat cushion with compression characteristics which differ by portions as set forth in claim 1, wherein the low hardness foamed body and the high hardness foamed body are polyurethane foamed bodies with soft composition.

* * * * *